ULTRA LINEAR AMPLIFIERS

Filed May 20, 1952

INVENTORS
DAVID HAFLER &
HERBERT I. KEROES

BY Hyman Hurwitz
THEIR ATTORNEY 2,710,312
Patented June 7, 1955

2,710,312

ULTRA LINEAR AMPLIFIERS

David Hafler and Herbert I. Keroes, Philadelphia, Pa., assignors to Acro Products Company, Philadelphia, Pa., a firm Application May 20, 1952, Serial No. 288,908

6 Claims. (Cl. 179—171)

The present invention relates generally to amplifiers, and more particularly to amplifiers capable of wide band linear response, operable with substantially no distortion produced by harmonic response or intermodulation over a wide dynamic range, and with excellent efficiency. The amplifier of our invention finds particular application to audio power amplifiers, but may be applied with equal effect to a wide range of uses, and at supersonic and radio frequencies, as well as at audio frequencies.

It can be demonstrated that a wide pass band and low harmonic response, in an audio power amplifier, do not of themselves provide quality performance, when performance is judged by the initiated listener, because speech and music are not of static nature. There have, accordingly, been developed criteria of amplifier performance in terms of intermodulation distortion analysis and square wave testing, both of which simulate dynamic conditions to considerable extent. Even such tests are not fully determinative of amplifier performance, since amplifiers which test well do not always sound well, although amplifiers which test poorly always sound poorly.

On the basis of listening tests, which are conceded to provide the ultimate criteria, there are two schools of thought. One adheres to the use of triode amplifiers, on the ground that such amplifiers produce sweet or smooth sound. The other adheres to the use of tetrodes, usually of the beam power type, as providing crisp or clean sound. Each tube type obviously produces its own character of distortion, which is pleasing to its advocates, and displeasing to its opponents. It is found that these distortions are elusive, and unmeasurable, but nevertheless real to the critical listener.

It would then appear that reconciliation of the two schools of thought could only be accomplished by some new tube type, not presently available, and which might provide a response acceptable to both. Such a tube should have certain desirable electrical characteristics, in addition, which are not presently all available in either the triode or the tetrode. These may be listed as follows:

(1) Low internal impedance—now offered by the triode but not the tetrode.

(2) High power sensitivity—now offered by the tetrode but not the triode.

(3) Lower harmonic and intermodulation distortion than either the triode or the tetrode, at both high and low levels.

(4) High efficiency, to permit adequate power output without undue bulk or cost.

The basic difference between the triode and the tetrode is the screen grid in the latter. Its presence gives the tetrode high efficiency, but its absence gives the triode low plate resistance.

When the screen grid of a tetrode is connected directly to the anode of the tetrode the resulting tube is effectively a triode, which, however, has limited power output and dissipation. We have therefore analyzed the effects of tetrode operation in intermediate conditions, i. e. with the screen connected to part of the load as an active tube output element. In this condition the screen is partially energized by the output signal due to plate current variations, and partially by a D.-C. static operating potential. The distinction from full triode operation of a screen grid tube is then, that the screen is not connected directly to the anode, but across part of the anode load only.

Experimentation on this basis has produced remarkable and unexpected results. It is found that for specific ranges of percentage of screen loading taken in comparison with anode loading, depending on tube types employed and modes of operation, very favorable operational characteristics result. In this connection a tetrode, operated in the normal manner, is taken to have 0% screen loading. When operated as a full triode it is taken to have 100% screen loading. For intermediate values the percentage of screen loading to anode loading is defined as the square of the voltage ratio between signal voltage at the screen, and signal voltage at the plate. Percentage screen loading may thus be defined as the percentage of plate circuit signal power transferred to the screen. It should be noted that power is transferred to the screen only over part of the signal cycle, i. e. when the absolute value of plate potential falls below the absolute value of screen potential. This transfer has the effect of linearizing the plate characteristics.

It is found, for example, that with tubes of the 6L6 type, operating Class $AB_1$, the internal impedance of the tube drops very sharply as one proceeds from zero screen loading, but levels off at a very low value beyond about 18% screen loading. Maximum undistorted power output falls only slightly out to about 18% loading, and is very high, but beyond that value drops fairly rapidly. Low level distortion decreases rapidly from 0% to 18% loading, and far less rapidly thereafter. High level distortion is low out to 18% loading, but increases rapidly as loading is further increased.

It follows that with properly proportioned screen loading, depending on tube type, a tetrode can provide the high output power normally associated with tetrodes, but with low internal impedance, with very little more low level distortion than is produced by a triode, but with much less high level distortion.

In effect, then, we have provided a new tube type, which is neither triode nor tetrode, but which possesses advantages of each, and which is of increased linearity. The latter effect can perhaps be simply explained as a straightening of the plate transfer characteristics of a triode, which are concave upward, by virtue of the plate transfer characteristics of the tetrode, which are concave downward. Whatever the true explanation, the plate transfer characteristic of the tetrode arranged in accordance with our invention is remarkably linear.

It may be stressed that an approximately 18% loading figure for optimum performance applies to several tube types, including the 6L6, the 5881, the 807 or KT–66. These latter enable 24 watts output to be obtained for .75 volt input, when provided with a phase inverter and driver stage. For tubes of the 6V6 type a screen loading value of about 5% is preferred, and for still other tube types still a different value may be optimum.

It is known that a limiting factor in operating screen grid tubes in the normal operation, i. e. with zero screen loading, is screen dissipation. Tube manufacturers generally list static operating potentials and currents for maximum allowable screen dissipation. Under dynamic conditions these may exceed the allowed maxima for a sufficiently long period to cause tube damage, when a tetrode is operating as such, i. e. with screen fully unloaded.

With our novel arrangement the potential of the screen is no longer fixed, but it follows the potential of the plate. It follows that the screen does not as greatly exceed the plate in potential, as in the case when the screen is unloaded, and the tube can be safely operated at voltages considerably in excess of those recommended as maxima by the manufacturer, with consequent enhanced performance.

It is, accordingly, a broad object of the present invention to provide a novel signal amplifier, of improved performance and operating characteristics.

It is a more specific object of the invention to provide a mode of tetrode operation, in an amplifier circuit, such that ultra linear input-output relationship is accomplished.

It is a still more specific object of the invention to provide an audio amplifier circuit employing one or more tubes having screen electrodes, in which the one or more tubes are provided with loaded screen electrode circuits, loading being selected to provide low internal tube impedance, high output, and low intermodulation distortion and harmonic response.

It is a further specific object of the invention to provide screen grid tube operation in an amplifier, the screen grid of the tube being loaded between about 5% and 30%.

The above and still further features, objects and advantages of the present invention will become evident upon consideration of the following detailed description of several specific and preferred embodiments of the invention, especially when taken in conjunction with the accompanying drawings, wherein.

Figure 1:
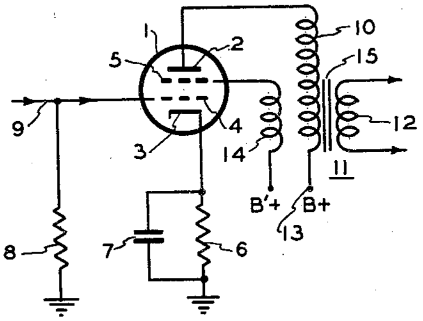
Figure 1 is a schematic circuit diagram of a first embodiment of our invention, operated single ended.

Referring now more specifically to the drawings, the reference numeral 1, in Figure 1, identifies a tetrode vacuum tube, having an anode 2, a cathode 3, a control grid 4, and a screen grid 5. A bias resistor 6, by-passed for audio signals by a condenser 7, is connected between cathode 3 and ground. A grid leak resistor 8 is connected between control grid 4 and ground, and signal to be amplified is applied to lead 9, and hence between control grid 4 and ground. The circuit as specifically described to this point is conventional.

In the anode circuit of the tube 1 is connected the primary winding 10 of an audio output transformer 11, provided with a secondary winding 12. The winding 10 is in series with a B+ source (not shown), but connected to terminal 13. A further primary winding 14 is provided, in transformer 11, in series with a separate voltage source B'+. In the alternative, it will be evident that windings 14 and 10 may be connected in parallel, and to a single common B+ source.

The winding 14 is provided with fewer turns than is the winding 10, so that its impedance at any frequency is preferably about 18.5% of the impedance of winding 10, although this value is optimum and not critical, and a satisfactory range of values may be taken to extend from 15% to 25%, for tubes of the 6L6, or the 807 type. It is conceivable that a different percentage of loading might be required for tubes of different design parameters than those tested by us to date, but in all cases the value is so selected that extremely linear composite response occurs, and so that tube impedance is low, but output high. This means that the tetrode 1 operates like a tetrode in respect to output level, like a triode in respect to internal impedance, and with a plate transfer characteristic intermediate that of a triode and tetrode, and more linear than either.

The windings 10 and 14 are wound on a common core 15, and jointly contribute output to secondary winding 12.

Figure 2:
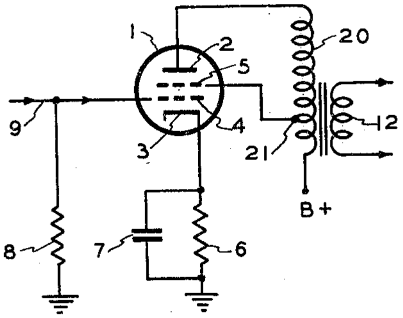
Figure 2 is a schematic circuit diagram of a modification of the arrangement of Figure 1.

The same parts in Figures 1 and 2 are similarly referenced, and it will be noted that Figures 1 and 2 are similar, except that in Figure 2 a single primary winding 20 is utilized, which is tapped at a point 21, for connection to screen grid 5. The point 21 is so selected as to load the screen grid 5 preferably about 18.5%, or in the range 5% to 25%, as in Figure 1. Figures 1 and 2 represent then equivalent alternative constructions, Figure 2 being the simpler and more economical, but being subject to the limitation that the screen grid 5 and the plate 2 are at identical D. C. static potential.

Figure 3:
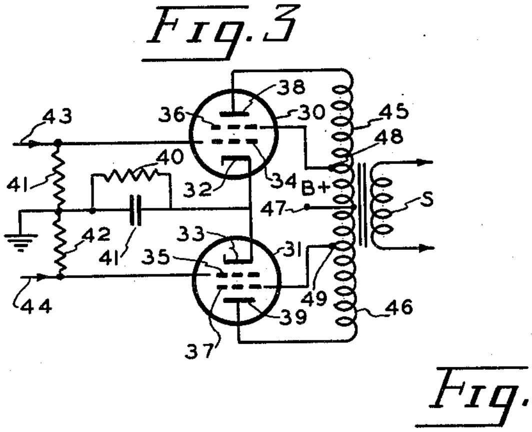
Figure 3 is a schematic circuit of a push-pull amplifier corresponding generally with the embodiment of Figure 2.

Figure 3 shows the connection of two tubes in push-pull arrangement, following the teaching of Figure 2 of the accompanying drawings. It will be clear to one skilled in the art that the arrangement of Figure 1 may be push-pull, instead of single ended, if desired.

In the system of Figure 3, the arrangement of Figure 2 is converted to push-pull or double ended operation. The tubes 30, 31 are respectively provided with cathodes 32, 33, control grids 34, 35, screen grids 36, 37 and anodes 38, 39. The cathodes 32, 33 are directly interconnected, and via bias resistance 40 to ground. The resistance 40 is by-passed for audio signals by a condenser 41. It is evident that other arrangements for providing bias may be used also.

Connected between control grid 34 and ground is a grid leak 41, and between control 35 and ground a grid leak 42. The control electrodes 34 and 35 are driven in balanced relation with respect to ground, by signals applied in opposed phase to leads 43, 44. Alternately, other input coupling schemes can be used.

Primary winding halves 45, 46 are connected in series, respectively, with the anodes 38, 39, the junction of the winding halves 45, 46 being supplied with a terminal 47 for connection to a source of B+ voltage. A secondary winding S is coupled with primary halves 45, 46.

The screen grids 36, 37 are connected at points 48, 49 of winding halves 45, 46. The points 48, 49 are selected to provide for the screen grids 18.5% of the loading provided for anodes 38, 39. It will be clear that the specified percentage is not critical, but preferred, and that a range of values about 5% to 25% may be selected, without serious operational variation, as will become clear when the operational characteristics of the amplifier are described hereinafter.

Figure 4:
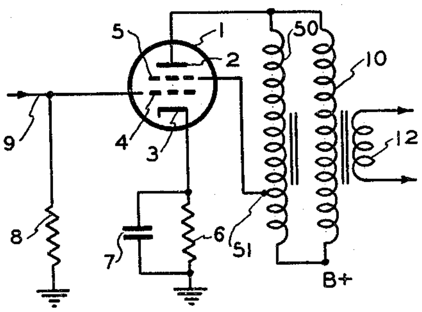
Figures 4 and 5 are schematic circuit diagrams of further modifications of our invention.

In the modification of our invention illustrated in Figure 4 of the accompanying drawings the loading of the screen grid is accomplished by connecting a choke 50 across primary winding 10, and the screen grid is connected to a point 51 of the choke 50 such as to accomplish the desired loading. The choke thus acts effectively as an auto-transformer. The result accomplished by means of choke 50 is accomplished in the embodiment of our invention illustrated in Figure 5 of the accompanying drawings by means of a resistor 52, connected across winding 10 and tapped at a point 53 which is 18.5% from the B+ end. The tap 53 is connected with screen grid 5. In other respects the embodiments of our invention illustrated in Figures 4 and 5 follow closely the embodiment of Figure 1, and accordingly, identical parts and elements in the several Figures 1, 4, 5 are identified by corresponding numerals of reference.

Figures 5, 6:
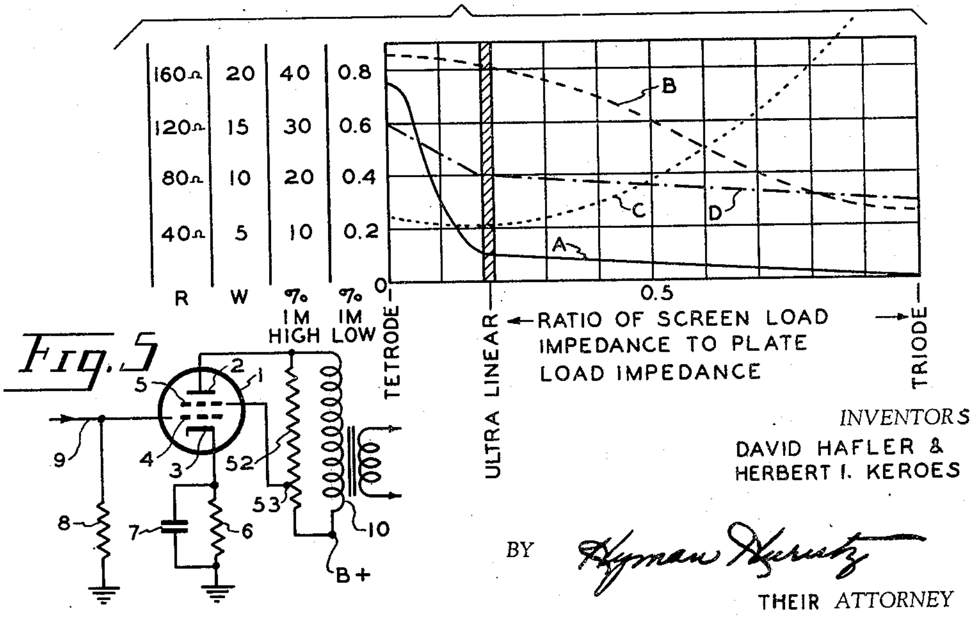
Figure 6 is a plot illustrating certain operating characteristics of the arrangements of Figures 1–5, inclusive.

It will be clear that each of the embodiments of our invention which is illustrated as operating single ended may be modified to operate in push-pull or balanced relation, by adopting the general circuit configuration of Figure 3, modified to include the appropriate screen grid loading expedients of Figures 1, 4, 5, respectively.

Referring now to Figure 6 of the accompanying drawings, there are illustrated four plots, A–D, inclusive. Plot A shows the range of values of tube impedance for all ranges of screen grid loading, from 0 to 100%. Screen grid loading of 0% represents zero impedance in series with the screen grid, while screen grid loading of 100% represents triode operation, i. e. equal impedance in series with anode and screen grid. The latter operation is normally accomplished by directly connecting the screen grid to the anode of the tube. It will be clear from the plot that the internal impedance of the specific tube for which the plot was made decreases rapidly as screen loading increases from 0%, until a value of screen loading of about 18.5% is attained. For further increase in loading but relatively slight decrease in tube impedance is attained.

Plot B indicates the relation between watts W of undistorted output and values of screen loading between 0% and 100%. It will be noted that the value of output is reasonably level out to about 18% loading, and thereafter decreases to a relatively low value for triode operation.

Plot C indicates the percentage of high level distortion caused by intermodulation. It will be noted that distortion at 18% screen loading is about 10%, and is about the same as exists for normal tetrode operation. This type of distortion increases rapidly thereafter, as triode operation is approached. Plot D, which indicates percentage low level intermodulation distortion, shows about .6% distortion for normal tetrode operation, and decreases to about .4% for 18.5% screen loading. For further increase of loading relatively slight improvement in low level intermodulation distortion is accomplished.

It will be clear from the plots A–D, inclusive, that a considerable range of screen loading, deviating from 18.5% loading, will provide high quality operation, and the useful range may be described as extending from 5% to 30%, 18.5% being clearly an optimum value, for the particular tube for which the plot of Figure 6 was made.

While we have described and illustrated one specific embodiment of our invention, it will be clear that variations of the general arrangement and of the details of construction which are specifically illustrated and described may be resorted to without departing from the true spirit and scope of the invention. In particular the invention may be applied to any tube type which is sufficiently analogous in operation to the screen grid tube, and particularly to pentodes and beam power tetrodes, which provide screen electrodes.

What we claim is:

1. A push-pull high fidelity audio amplifier having a first vacuum tube and a second vacuum tube, said first vacuum tube having a first anode, cathode, control electrode and screen electrode, said second vacuum tube having a second anode, cathode, control electrode and screen electrode, means for connecting said first and second control electrodes in balanced relation to a balanced source of high fidelity audio signal, means for biasing said first and second control electrodes for alternative anode current flow in response to alternate half cycles of said high fidelity audio signal, a balanced output circuit connected between said anodes, said balanced output circuit comprising a primary winding of an output transformer, a balanced output circuit connected between said screen electrodes, said last mentioned output circuit including a portion of the turns of said primary winding, said amplifier having operating characteristics as a function of screen grid loading such that tube impedance has substantially a minimum value for a relatively critical value of said loading, value of watts of undistorted output has substantially a maximum for said value of loading, percentage of high level distortion caused by intermodulation has substantially a minimum value for said value of loading, and percentage of low level intermodulation distortion has substantially a minimum value for said value of loading, and wherein the points of connection of said screen grids to said primary winding are substantially such as to provide said relatively critical value of said loading.

2. The combination in accordance with claim 1 wherein said screen grid loading is substantially 18.5%, and wherein said vacuum tubes are equivalents of the 6L6 type.

3. The combination in accordance with claim 1 wherein said vacuum tubes are equivalents of the 6L6 type.

4. The combination in accordance with claim 1 wherein said vacuum tubes are equivalents of the 6L6 type and are operated class $AB_1$.

5. The combination in accordance with claim 1 wherein said vacuum tubes are equivalents of the 6V6 type and said screen grid loading is approximately 5 per cent.

6. The combination in accordance with claim 1 wherein the tube types employed are selected from commercial types 6L6, KT–66, 5881, and 807, and wherein said screen grid loading falls in the range 18 per cent to 26 per cent.

References Cited in the file of this patent

UNITED STATES PATENTS

| | | |
|---|---|---|
| 1,953,775 | Robinson | Apr. 3, 1934 |
| 2,216,465 | Wilhelm | Oct. 1, 1940 |
| 2,218,902 | Blumlein | Oct. 22, 1940 |
| 2,273,511 | Brück | Feb. 17, 1942 |
| 2,380,923 | Cannon | Aug. 7, 1945 |
| 2,651,685 | Tharp | Sept. 8, 1953 |

OTHER REFERENCES

RCA Receiving Tube Manual, page 21; pub. 1947 by R. C. A., N. Y. Copy in Div. 69.

Terman text, "Radio Engineering," 3rd ed., pages 299–307; pub. 1947 by McGraw-Hill Book Co., N. Y. C. Copy in Div. 69.